Nov. 25, 1969    J. D. BARBIERI ET AL    3,480,788
RESOLVING COMPASS UTILIZING PHOTO-POTENTIOMETERS
Filed April 7, 1966    3 Sheets-Sheet 1
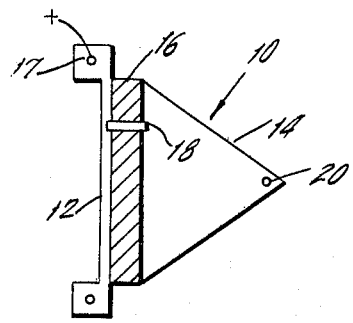
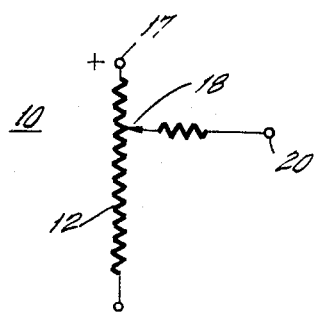
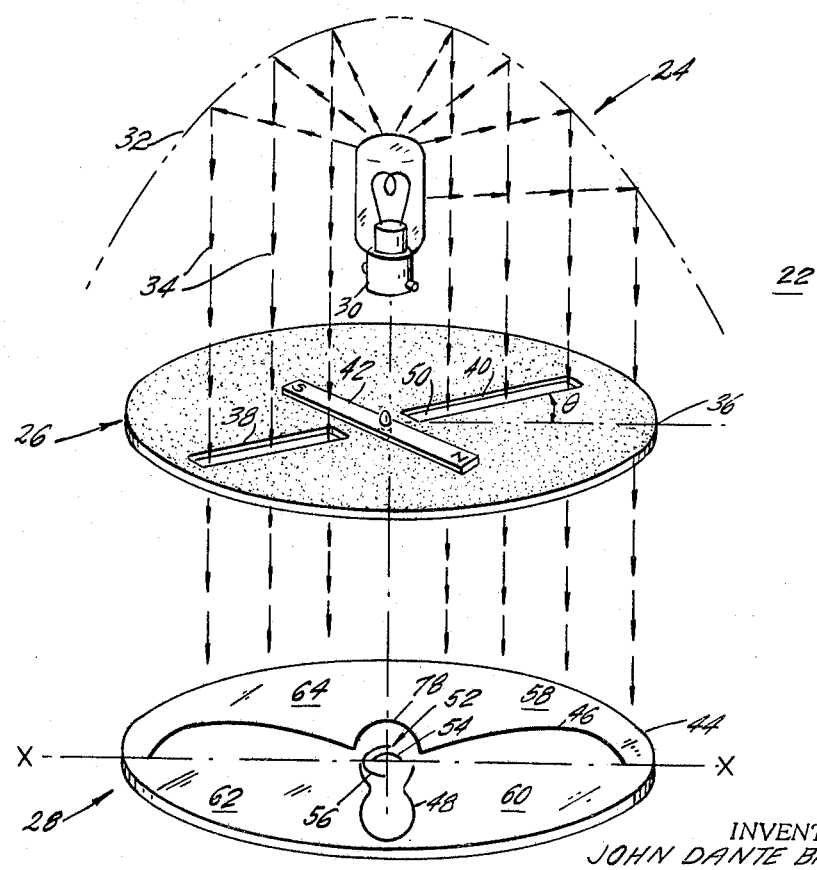
INVENTOR.
JOHN DANTE BARBIERI
GEORGE GUCKER
BY Nov. 25, 1969    J. D. BARBIERI ET AL    3,480,788
RESOLVING COMPASS UTILIZING PHOTO-POTENTIOMETERS
Filed April 7, 1966    3 Sheets-Sheet 2
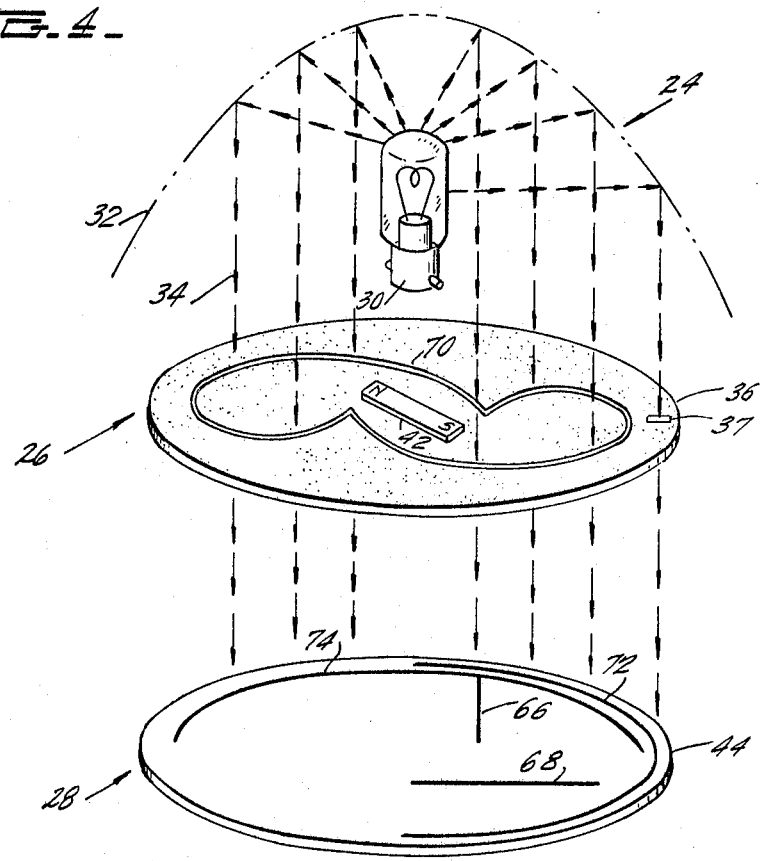
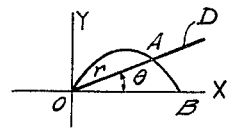
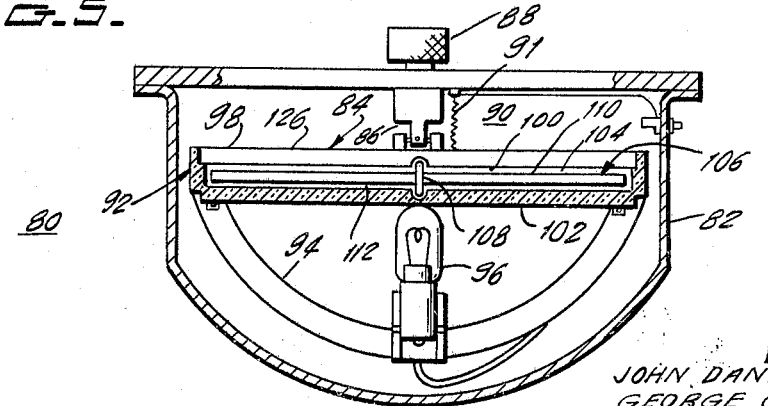
INVENTORS
JOHN DANTE BARBIERI
GEORGE GUCKER
BY Nov. 25, 1969     J. D. BARBIERI ET AL     3,480,788
RESOLVING COMPASS UTILIZING PHOTO-POTENTIOMETERS
Filed April 7, 1966
FIG. 6.
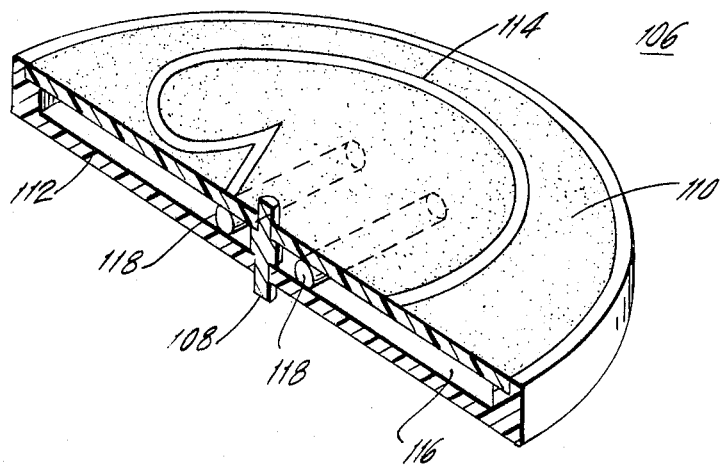
FIG. 7.
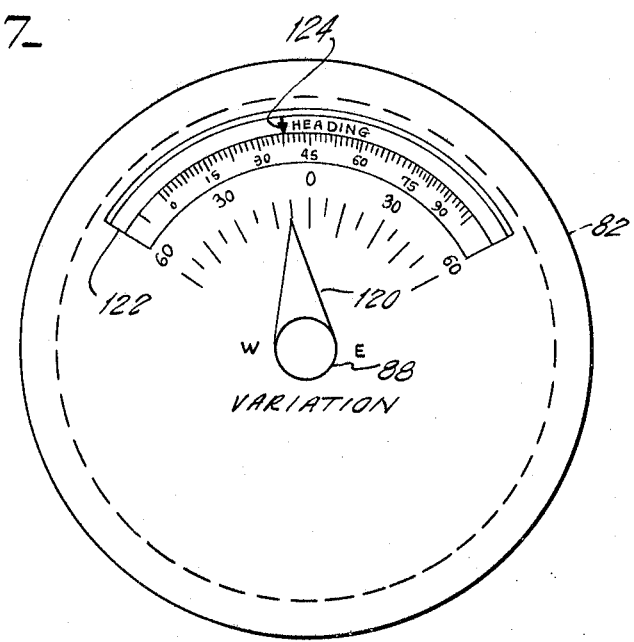
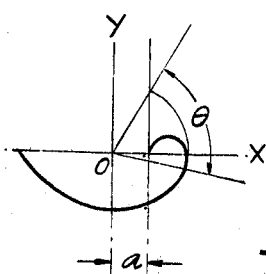
FIG. 4a.
INVENTORS
JOHN DANTE BARBIERI
GEORGE GUCKER
BY United States Patent Office 3,480,788
Patented Nov. 25, 1969

3,480,788
RESOLVING COMPASS UTILIZING
PHOTO-POTENTIOMETERS
John Dante Barbieri and George Gucker, Howard Beach, N.Y. (both of Ford Institute Co., Division of Sperry Rand Corp., 31—10 Thomson Ave., Long Island City, N.Y. 11101)
Filed Apr. 7, 1966, Ser. No. 540,908
Int. Cl. H01j 3/14, 5/16
U.S. Cl. 250—237                                17 Claims

ABSTRACT OF THE DISCLOSURE

A resolving compass utilizes a photo-potentiometer to obtain output information related to angular position of a rotatable member. The light sensitive pattern of the photo-potentiometer is stationary and is actuated by light passing through aperture means driven by the movable compass member. The aperture provides a pattern which cooperates with the light sensitive pattern to produce an electrical output indicating angular position. One of the patterns (aperture or light sensitive) is of a straight line configuration while the other pattern is a curve configuration.

---

This invention relates to compasses in general, and more particularly to a resolving photo compass comprising a rotating compass assembly and a lightt-activated potentiometer oriented with respect to one another to produce coordinate output components representative of the angular displacement of the compass assembly relative to the light-activated potentiometer.

Many systems such as airborne navigation, gunfire control, sunobouy, etc. require as an input, signals which are representative of the coordinate components of a voltage representing distance, velocity, or heading. For navigation, guidance, or surveying instruments it is particularly useful to resolve angular heading into northerly and easterly components, which as can be easily understood, may be represented by trigonometric functions, such as the sine and cosine of angular heading.

Prior art methods for resolving angular heading into sine and cosine coordinates have been relatively complex, expensive, and somewhat inaccurate over long periods of use. For example, one method is to employ a flux valve with a follow-up servo driving a sine-cosine potentiometer with quadrant switches being provided to provide a proper sign for the trigonometric functions derived. Another method presently available is to employ an inertial system, either platform or strap-down, in conjunction with a resolving computer which may be either analogy or digital. Both methods described are relatively complex, expensive, require sophisticated A.C. power supplies, and because of the servo systems involved, have an inherent servo response lag. Furthermore, inherent in inertial systems, are long-term drift errors which detract from the accuracy of the instrument.

In contrast to the prior art methods described above, the instant invention comprises simply a light source; a magnetic sensitive compass assembly which permits a predetermined pattern of light to pass therethrough; and lightsensitive means preferably in the form of light-activated potentiometers (to be described in greater detail) for monitoring displacement of the predetermined pattern of light, and necessarily the revolving compass assembly, relative to a predetermined reference point. Further, and in accordance with the instant invention, the predetermined pattern of light and the light-activated potentiometers are oriented with respect to one another such that the voltage output of the potentiometers is a trigonometric function of the angular displacement of the revolving compass assembly.

In order to determine the appropriate sign of the trigonometric function thus derived, novel quadrant determining logic circiuts are provided and preferably are comprised of the same or similar light-activated potentiometers which are used to derive the trigonometric outputs.

In one particular embodiment of the instant invention, the predetermined pattern of light which is permitted to pass throught the revolving compass assembly takes the form of a straight line which is etched from a generally opaque surface of the revolving compass assembly. The light-activated potentiometers are arranged in a predetermined configuration such that interaction of the light passing through the compass assembly and the potentiometer provides a voltage output proportional to trigonometric functions of the angular displacement of the revolving compass assembly. By choosing a particular curve for the light-activated potentiometers, the trigonometric output potentials may be sine and cosine in order to resolve angular heading into northerly and easterly components.

In an alternative embodiment of the instant invention, the predetermined pattern of light etched on the opaque surface of the revolving compass assembly may have the curved configuration which was previously assigned to the light-activated potentiometers, while the light-activated potentiometers may be in the form of a straight line. It should be understood, however, that by properly choosing the shapes of the pattern of light and the potentiometer configuration either embodiment may be utilized to derive output functions which are other than sinusoidal components of the angular heading of the revolving compass assembly.

As a particularly advantageous feature of the instant invention, the entire resolving photocompass of the instant invention is supported within a fluid filled casing by a universal joint which permits the revolving compass assembly to remain essentially level despite casing tilt while at the same time effectively reducing the effects of transient shock and accellerations.

As a further advantage of the instant invention, the revolving compass assembly is of hollow construction and is designed as to be substantially buoyant within an airtight housing which is similarly filled with a damping fluid. Advantageously, the buoyant nature of the hollow revolving compass assembly reduces frictional forces developed between the housing surfaces and the dual-ended pivot which supports the revolving compass assembly within the housing.

As another advatnageous feature of the instant invention the photoconductive material of the light-activated potentiometer, to be described in greater detail, is selected so as to be responsive to the light generated by a tungsten filament bulb such that the power supply required for the photo resolving compass of the instant invention need not be of the sophisticated nature required in the prior art systems described above.

It is apparent from the brief description of the invention given above that the instant invention is small, compact, portable, relatively simple, inexpensive, responds instantaneously to sudden changes in heading, does not have long-term drift errors as inertial systems of the prior art do, and further more does not require a sophisticated power supply.

Accordingly, it is an object of the instant invention to provide a resolving photo compass which comprises means for generating light; revolving compass means positioned to intercept the light, with such compass means including masking means positioned thereon for permitting a predetermined pattern of light to pass therethrough; and photo-sensitive means positioned to intercept the predetermined pattern of light for monitoring displacement of the predetermined pattern of light (and necessarily the revolving compass means) relative to a predetermined reference point.

It is another object of the instant invention to provide such a resolving photo compass wherein the photo-sensitive means comprises a light-activated potentiometer.

Another object of the instant invention is to provide such a resolving photo compass which is capable of generating northerly and easterly components of angular heading, wherein such northerly and easterly components of angular heading, wherein such northerly and easterly components comprise trigonometric representations thereof.

Still another object of the instant invention is to provide a resolving photo compass which is capable of generating any desired function of angular heading as an output.

Another object of the instant invention is to provide a resolving photo compass which is simple, inexpensive, lightweight, portable, compact, inidependent of sophisticated power supply, protected from transient shock, and so constructed as to minimize error derived from the frictional engagement of moving parts.

Other objects and a fuller understanding of the instant invention may be had by referring to the following specification and drawing, in which:

FIGURE 1 is a somewhat schematic illustration of a light-activated potentiometer;

FIGURE 2 is an equivalent circuit of a light-activated potentiometer of FIGURE 1;

FIGURE 3 is a somewhat schematic perspective view of one embodiment of the instant invention;

FIGURE 3a is a graph of the embodiment of FIGURE 3;

FIGURE 4 is a somewhat schematic perspective view of a second embodiment of the instant invention;

FIGURE 4a is a graph of the embodiment of FIGURE 4;

FIGURE 5 is a side elevational view of the configuration of one possible embodiment of the instant invention;

FIGURE 6 is an enlarged perspective cut-away view of a portion of the instrument shown in FIGURE 5; and FIGURE 7 is a plan view of the instrument shown in FIGURE 5.

In order to understand the invention, it is first necessary to understand the operation of a light-activated potentiometer which for purposes of explanation has been somewhat schematically shown in FIGURE 1 and identified by the reference character 10. The light-activated potentiometer 10 includes a high resistance element 12, having a potential impressed on terminal 17 thereof, placed along side of a high conductance element 14, both the elements 12 and 14 being placed on top of a photo-resistive material 16 such as cadmium sulfide, CdS, or cadmium selenide, CdSe. As will be further explained, cadmium selenide is selected for the instant invention when the light source being used is a tungsten filament bulb, whereas cadmium sulfide would be employed where sunlight or electroluminescent panels is the source of light.

Whichever selected, the photo-resistive material 16 has a very high resistance when dark. However, when a small area, such as that indicated at 18 in FIGURE 1, is illuminated, the resistance of that area drops greatly. Assuming that the light spot 18 is large enough to bridge the gap between elements 12 and 14, the light spot acts as a wiper does in a conventional slide wire potentiometer and provides a voltage output on terminal 20 of element 14 which is proportional to the light spot position along element 12.

FIGURE 2 illustrates the equivalent circuit of the light-activated potentiometer 10 of FIGURE 1. As indicated, the output voltage taken at terminal 20 is linearly dependent on the position of the light bar 18 relative to the high resistance element 12. Thus for purposes of further discussion, the light-activated potentiometer may be considered as a conventional slide wire potentiometer.

Refering to FIGURE 3, there is shown a somewhat schematic perspective view of one possible embodiment of the resolving photo compass 22 of the instant invention. The resolving photo compass 22 may be considered as having three main assemblies; a light source 24, a revolving compass assembly 26 and a light-activated potentiometer assembly 28.

The light source 24 is shown to include a lamp 30, preferably of the tungsten filament type, and a parabolic reflector 32 which is suitably shaped to provide parallel light beams, schematically illustrated at 34, which are intercepted by the revolving compass assembly 26.

Revolving compass assembly 26 comprises an opaque disc or card 36 which has two radial slots 38 and 40 along a diameter thereof. Disc 36 further includes a magnet 42 oriented substantially transverse with respect to the slots 38 and 40. As is well known in the compass art, the magnet bar 42 (and necesarily the disc 36 secured thereto) will rotate in an attempt to align itself with magnetic north.

Positioned below the compass asembly 26 and in the path of light beam 34 is a stationary plate 44 upon which light-activated potentiometers 46 and 48 are positioned. It is to be understood that the curves identified by the reference characters 46 and 48 would in reality correspond to the photoconductive material such as 16, shown in FIGURE 1, and that for the sake of simplicity in FIGURE 3, elements corresponding to 12 and 14, in FIGURE 1, have been eliminated. As will be explained in greater detail, the light-activated potentiometers 46 and 48 are of such shape that the voltage output of potentiometers 46 and 48, as determined by the position of the bars of light which pass through slots 38 and 40 and cross the potentiometers, is a function of the sine and cosine, respectively, of the angle $\theta$ between the $x$–$y$ axis and the bar of light. In this respect it will be understood that the light activated potentiometers 46 and 48 (as well as the potentiometers 54 and 56 described below) have in contact therewith separate electrodes for providing a complete electrical circuit path through the light activated material from the terminals of a potential source to an output terminal. One of these electrodes is in contact with the high conductance element of the potentiometer (element 14) while the other electrode is in contact with the high resistance element (element 12). In this respect, the high resistance element 12 is connected to the terminals of the potential source and the high conductance element is connected to the output terminal.

Referring back to campass assembly 26, it will be seen that one of the slots is longer than the other, indicated at 50, near the center of the disc 36. The light passing through the elongated slot 40 at 50 cooperates with light-activated quadrant switches indicated at 52 in order to determine the appropriate sign and hence appropriate quadrant of the trigonometric outputs of light-activated potentiometers 46 and 48.

Specifically, in the embodiment shown, light-activated quadrants switches 52 would comprise two light-activated potentiometers 54 and 56, which may be similar to the light-activated potentiometers 46 and 48, which when combined with appropriate logic circuitry will provide a positive indication of the quadrant through which the slot 40 (and bar of light) is passing. To go one step further, it will be apparent that when only light-activated potentiometer 54 is conducting, the slot 40 will be in the quadrant identified by the character 58. When no quadrant potentiometer is conducting the slot 40 will be in quadrant 60. When only the outer quadrant switch 56 is conducting the slot 40 will be in quadrant 62, and when both quadrant switches 54 and 56 are conducting, the slot will be uniquely determined in quadrant 64.

Referring to FIGURE 4, there is shown an alternative embodiment of the instant invention, with like numerals being used to designate like parts. In essence there are only two distinctions between the embodiments of FIGURES 3 and 4. Whereas in FIGURES 3 the straight line slots 38 and 40 were provided in revolving compass disc 36 and the curved potentiometers 46 and 48 were used on the plate 44; in FIGURE 4 the system is reversed such that straight line potentiometers 66 and 68 are used on the plate 44 and a curved slot 70 is utilized on the revolving compass disc 36. It is noted that the reversal of functions does not affect the results in that the output of the potentiometers 66 and 68 will still be a function of the sine and cosine, respectively, of the angle of rotation of the revolving disc 36.

A seocnd distinction may be noted in that the quadrant determining potentiometers 54 and 56 of FIGURE 3 were located at the center of the plate 44, whereas in FIGURE 4 the quadrant determining potentiometers 72 and 74 are located adjacent the perimeter of the plate 44 with light being uniquely cast thereon by means of a small slit 37 provided near the external perimeter of the revolving disc 36.

It is to be noted that the embodiment illustrated in FIGURE 4 is the more desirable from practical engineering considerations as is considerably easier to form the light-activated potentiometers 66 and 68 as a straight line, and shape the slot 70 on disc 36 in the required curve.

The derivation of the required curve in the embodiment of FIGURE 3, is as follows:

Remembering the operation of a light-activated potentiometer, and recognizing in FIGURE 3a that S=the arc length AB cut by bar light D, and
C=the arc length OAB of the potentiometer.

The problem is to find $F(\theta)$ such that:

$$S/C = \sin \theta$$

Since the differential of an arc in polar coordinates may be expessed as $$ds = \sqrt{\left[r^2 + \left(\frac{dr}{d\theta}\right)^2\right]} d\theta$$

then the rac length $$s = \int_{\theta_1}^{\theta} \sqrt{\left[r^2 + \left(\frac{dr}{d\theta}\right)^2\right]} d\theta$$

Substituting this expression into the equation $S/C = \sin \theta$ and differentiating both sides of the equation one gets $$\sqrt{r^2 + \left(\frac{dr}{d\theta}\right)^2} = C \cos \theta$$

and squaring both sides $$r^2 + \left(\frac{dr}{d\theta}\right)^2 = C^2 \cos^2 \theta$$

solving for $dr/d\theta$ the result is $$\frac{dr}{d\theta} = \sqrt{C^2 \cos^2 \theta - r^2}$$

and thus the curve of potentiometers 46 and 48 in FIGURE 3 is uniquely determined.

Finally, to reduce errors of manufacture the potentiometers 46 and 48, in FIGURE 3 should be modified near the center as indicated at 78.

A derivation of the curve required for the mask in the embodiment shown in FIGURE 4 would yield the following parametric equations which define the curve in rectangular coordinates $x$ and $y$.

$x = a \cos \theta + \sin^2 \theta$
$y = a \sin \theta + \sin \theta \cos \theta$ where looking at FIGURE 4a it is readily apparent that:

$a$=the distance from the origin to the beginning of the curve defined by the parametric equation, and
$\theta$=the angle betwen a line drawn from the origin to a point on the curve and a line drawn from the origin to a point on the light-activated potentiometer, both points being equidistant from the origin.

Referring to FIGURES 5, 6 and 7 there is shown a preferred embodiment of the instant invention which has been constructed in accordance with the principles outlined above. Specifically in FIGURE 5 the resolving photo compass 80 is seen to comprise a casing 82 and a photo resolving assembly 84. Due to the effects of the vertical component of the earth's magnetic field, it is desirable to incorporate the photo resolving assembly 84 in a pendulous arrangement suspended by universal joint 86 preferably with a plus and minus 15° of freedom about two axes, thus permitting the photo resolving assembly to remain essentially level despite tilting of the casing 82. A variation control knob 88 is provided to allow the entire photo resolving assembly 84 to be rotated with respect to the casing 82 to insert the necessary magnetic variation correction factor in accordance with the location of operation of the instrument 80. The interior 90 of the casing 82 is filled with high viscosity damping fluid in order to reduce the effects of transient shocks and accelleration on the photo resolving assembly 84. Flexible leads 91 are used to supply excitation power and to feed out the resolved signals.

The photo resolving assembly 84 is seen to comprise a hollow airtight housing 92 to which is secured a parabolic reflector 94 which in turn houses the light source 96 which in the preferred embodiment is a miniature tungsten filament bulb.

The housing 92 includes a first plate 98 upon one side 100 of which are positioned the light-activated potentiometers such as 46 and 48 if the embodiment of FIGURE 3 is being followed, or the light-activated potentiometers 66 and 68 if the teachings of the embodiment of FIGURE 4 are being followed. Since a tungsten filament light source is being used, the photo conductive material chosen for the potentiometer would preferably be cadmium selenide.

Sealingly joined to the circumference of plate 98 is a transparent support plate 102 which is spaced from plate 98 to form a housing chamber 104 within a compass assembly 106 is supported for rotation by means of a dual ended jewel pivot 108.

FIGURE 6 shows a preferred construction of the compass assembly 106 which is seen to comprise a pair of spaced parallel transparent plastic (such as lucite) elements 110 and 112 with the outer surface of element 110 having a substantially opaque coating thereon. Any suitable etching technique may be utilized on the opaque surface of element 110 to provide the accurate mask layout 114 which might correspond to lines 38, 40 in FIGURE 3, or curve 70 in FIGURE 4. Elements 110 and 112 cooperate to define a hollow interior 116 in which magnets 118 may be secured.

As stated previously the compass assembly is supported for rotation within the housing 104 by the dual ended pivot 108. In order to damp oscillations of compass assembly 106, the interior of housing 104 is filled with a damping fluid. Furthermore in order to reduce friction between the pivot 108 and plates 98 and 102, the volume of the interior 116 of the compass assembly 106 is so chosen as to make the compass assembly 106 buoyant in the damping fluid contained within housing 104.

Referring to FIGURE 7 there is shown a plan view of the casing 82 in which may be seen the manner in which the entire photo resolving assembly 84 may be rotated by the knob 88 to provide for magnetic variation corrections. A pointer 120 is secured to knob 88 and provides an indication of the present angular variation correction while a window 122 is provided to expose a pointer 124 on the upper surface 126 of plate 98, and the true heading scale which is provided on the upper surface 110 of compass assembly 106.

Thus there has been described a relatively simple and inexpensive resolving photo compass which is capable of generating northerly and easterly components of angular heading. Although there has been described a preferred embodiment of this novel invention, many variations and modifications will now be apparent to those skilled in the art. For example, as noted previously, the masking layouts and potentiometers may be oriented with respect to one another in such a manner as to provide any desired functions including linear functions of angular heading. Furthermore, the compass assembly could be driven by a shaft, as determined by a computer, instead of by a magnet aligning itself with the earth field.

Additionally it would be obvious to one skilled in the art to form the mask in a spherical, conical, cylindrical or any other symetrical shape whereby the resolving photo compass could be made more compactly and functions other than sine—cosine can be utilized.

Therefore it is to be understood, that this invention is to be limited not by specific disclosure but only by the appended claims.

What is claimed:

1. A resolving photo compass comprising:
   means for generating light;
   resolving compass means positioned to intercept said light, said compass means including masking means positioned thereon for permitting a predetermined pattern of light to pass through said compass means;
   photo-sensitive means positioned on a substantially stationary member on a side of said compass means opposite from said light generating means to intercept said predetermined pattern of light for monitoring displacement of said predetermined pattern of light relative to a predetermined reference point;
   said photo-sensitive means comprising a light-activated potentiometer which produces an output voltage as a function of the position of said predetermined pattern of light relative thereto;
   said light-activated potentiometer including high and low resistance electrodes spaced apart by photoconductive material having a high resistance when dark, and a low resistance when illuminated by light; with a potential impressed between terminals of said high resistance electrode, illumination of an area of said photoconductive material caused by said predetermined pattern of light being cast thereon causing the resistance of said area to drop to electrically connect said high and low resistance electrodes across said area to thereby provide a voltage output on said low resistance electrode which is proportional to the position of said area relative to said high resistance electrode.

2. The resolving photo compass of claim 1, wherein said masking means additionally permits a quadrant determining pattern of light to pass through said compass means, and further including quadrant determining photo-sensitive elements selectively located to intercept said quadrant determining pattern of light to provide an indication of the extent of revolution of said compass means.

3. The resolving photo compass of claim 1, wherein said photoconductive material is arranged in a predetermined configuration whereby said predetermined pattern of light will be cast thereon in such a manner as to provide a voltage output on said low resistance electrode which is a predetermined function of said displacement.

4. The resolving compass of claim 3, wherein said predetermined pattern of light is a straight line, and said predetermined configuration is a curve the shape of which is dependent upon the predetermined function chosen.

5. The resolving photo compass of claim 4, wherein said predetermined function is a sinusoidal function of said displacement and said curve is established by the relationship $$\frac{dr}{d\theta} = \sqrt{C^2 \cos^2 \theta - r^2}$$

where:
   $r$ = the distance from the origin of a graph upon which said curve may be drawn to any point on said curve
   $\theta$ = the angle which a line drawn from said origin to said point makes with respect to the X-axis of said graph
   $C$ = the length of said curve.

6. The resolving photo compass of claim 3, wherein said predetermined configuration is a straight line and said predetermined pattern of light is a curve the shape of which is dependent upon the predetermined function chosen.

7. The resolving photo compass of claim 6, wherein said predetermined function is a sinusoidal function of said displacement and said curve is established by the relationships $$x = a \cos \theta + \sin^2 \theta$$
$$y = -a \sin \theta + \sin \theta \cos \theta$$

where:
   $r$ = the distance from the origin of a graph upon which said curve may be drawn to any point on said curve
   $\theta$ = the angle which a line drawn from said origin to said point makes with respect to the X-axis of said graph
   $C$ = the length of said curve.

8. The resolving photo compass of claim 6, and further including a second light-activated potentiometer having high and low resistance electrodes spaced apart by photoconductive material having a high resistance when dark and a low resistance when illuminated by light, said high resistance electrode having a potential impressed thereon, the photoconductive material of said second light-activated potentiometer having the configuration of a straight line which is oriented transversely with respect to the photoconductive material of said first light-activated potentiometer to produce a sinusoidally varying output voltage on the low resistance electrode of said second light-activated potentiometer which is displaced relative to the voltage output on the low resistance electrode of said first light-activated potentiometer.

9. A resolving photo compass for generating coordinate components of the angular heading thereof, comprising:
   a casing; and
   a photo resolving assembly suspended within said casing, said photo resolving assembly including:
      a first plate having a predetermined configuration of light-activated potentiometers on one side thereof,
      a compass assembly mounted for rotation relative to said first plate, said compass assembly including a member having a substantially opaque surface having a transparent portion which permits only a predetermined pattern of light to pass therethrough, and
      a light source positioned to cast light through the transparent portion of said opaque surface onto said light-activated potentiometers,
   said predetermined configuration of light-activated potentiometers and said transparent portion being oriented with respect to one another to produce coordinate output components representative of the angular displacement of said compass assembly with respect to said first plate.

10. The resolving photo compass of claim 9, wherein said compass assembly further includes a transparent member spaced from the member having said substantially opaque surface in airtight relationship therewith to form a hollow interior, said hollow interior having a magnet securely located therein, said compass assembly being displaced relative to said first plate as a result of said magnet aligning itself with a magnetic field passing transversely relative thereto.

11. The resolving photo compass of claim 10, and further including a transparent support plate sealingly secured to and spaced from said first plate by a distance greater than the thickness of said compass assembly to form a housing therefor, said compass assembly being supported for rotation within said housing by a dual-ended pivot which passes through said compass assembly into bearing engagement with said first plate at one end thereof and said support plate at its other end thereof.

12. The resolving photo compass of claim 11, wherein the interior of said housing is filled with a damping fluid to damp oscillations of said compass assembly, and wherein the hollow interior of said compass assembly is of a preselected volume to make the compass assembly buoyant in said damping fluid.

13. The resolving photo compass of claim 9, wherein said photo resolving assembly is suspended within said casing by a universal joint secured therebetween, and said casing is filled with a damping fluid.

14. A resolving photo compass comprising:
means for generating light;
revolving compass means positioned to intercept said light, said compass means including masking means positioned thereon for permitting a predetermined pattern of light to pass through said compass means;
photo-sensitive means positioned to intercept said predetermined pattern of light for monitoring displacement of said predetermined pattern of light relative to a predetermined reference point;
said photo-sensitive means being of predetermined configuration to monitor said displacement as a predetermined function thereof;
said predetermined pattern of light being a straight line pattern; and
said predetermined configuration being a curve pattern the shape of which is dependent upon the predetermined function chosen.

15. The resolving photo compass of claim 14, wherein said predetermined function is a sinusoidal function of said displacement and said curve pattern is established by the relationship $$\frac{dr}{d\theta} = \sqrt{C^2 \cos^2 \theta - r^2}$$

where:
$r$=the distance from the origin of a graph upon which said curve may be drawn to any point on said curve
$\theta$=the angle which a line drawn from said origin to said point makes with respect to the X-axis of said graph
$C$=the length of said curve.

16. A resolving photo compass comprising:
means for generating light;
revolving compass means positioned to intercept said light, said compass means including masking means positioned thereon for permitting a predetermined pattern of light to pass through said compass means;
photo-sensitive means positioned to intercept said predetermined pattern of light for monitoring displacement of said predetermined pattern of light relative to a predetermined reference point;
said photo-sensitive means being of predetermined configuration to monitor said displacement as a predetermined function thereof;
said predetermined configuration being a straight line pattern; and
said predetermined pattern of light being a curve pattern the shape of which is dependent upon the predetermined function chosen.

17. The resolving photo compass of claim 16, wherein said predetermined function is a sinusoidal function of said displacement and said curve pattern is established by the relationships $$x = a \cos \theta + \sin^2 \theta$$
$$y = a \sin \theta + \sin \theta \cos \theta$$

where:
$a$=the distance from the origin along the X-axis of a graph upon which said curve may be drawn to the curve itself
$\theta$=the angle between a line drawn from the origin to a point on said curve and a line drawn from the origin to a point on said straight line, both points being equidistant from said origin.

References Cited

UNITED STATES PATENTS

| 3,254,226 | 5/1966 | Bobula et al. | 250—233 |
| 3,068,692 | 12/1962 | Morgan | 250—233 X |

FOREIGN PATENTS

| 0,250,946 | 4/1926 | Great Britain. |

OTHER REFERENCES

IBM Technical Disclosure Bulletin, vol. 4, No. 3 August 1961, "Variable Resistor Element" by J. O. Hildebrand and R. M. Rose. 338–15.

JAMES W. LAWRENCE, Primary Examiner

V. LAFRANCHI, Assistant Examiner

U.S. Cl. X.R.

33—222; 250—231; 338—15